US010895655B2

(12) United States Patent
Curry et al.

(10) Patent No.: US 10,895,655 B2
(45) Date of Patent: Jan. 19, 2021

(54) FABRICATION OF UNRECORDED DATA BY GAUSSIAN SLOWNESS PERIOD PACKET EXTRAPOLATION

(71) Applicants: William Curry, Houston, TX (US); Yaxun Tang, Spring, TX (US)

(72) Inventors: William Curry, Houston, TX (US); Yaxun Tang, Spring, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 334 days.

(21) Appl. No.: 15/989,280

(22) Filed: May 25, 2018

(65) Prior Publication Data

US 2019/0004199 A1    Jan. 3, 2019

Related U.S. Application Data

(60) Provisional application No. 62/526,669, filed on Jun. 29, 2017.

(51) Int. Cl.
| | | |
|---|---|---|
| *G01V 1/36* | (2006.01) | |
| *G01V 1/32* | (2006.01) | |
| *G01V 1/28* | (2006.01) | |
| *E21B 49/08* | (2006.01) | |
| *E21B 49/00* | (2006.01) | |

(52) U.S. Cl.
CPC ............ *G01V 1/364* (2013.01); *E21B 49/00* (2013.01); *E21B 49/087* (2013.01); *G01V 1/282* (2013.01); *G01V 1/32* (2013.01); *G01V 2210/57* (2013.01)

(58) Field of Classification Search
CPC .......... G01V 1/364; G01V 1/282; G01V 1/32; G01V 2210/57; E21B 49/00; E21B 49/087
See application file for complete search history.

(56) References Cited

U.S. PATENT DOCUMENTS

| | | | |
|---|---|---|---|
| 9,091,789 B2 | 7/2015 | Curry | ............................ 702/197 |
| 2010/0091610 A1* | 4/2010 | Sollner | ..................... G01V 1/38 367/24 |

(Continued)

OTHER PUBLICATIONS

Fei, Tong W. et al. (2012) "Full waveform inversion without low frequencies: A synthetic study," *SEG Technical Program Expanded Abstracts*, pp. 1-5.

(Continued)

*Primary Examiner* — Manuel L Barbee
(74) *Attorney, Agent, or Firm* — ExxonMobil Upstream Research Company—Law Department

(57) ABSTRACT

A computer-implemented method for generating missing frequencies within geophysical data, said method including: decomposing, with a computer, geophysical data into frequencies and slowness or wavenumber along time and one or more spatial dimensions; estimating, with a computer, a filter across known frequencies within the geophysical data for each time, spatial dimension, and slowness or wavenumber sample; extrapolating or interpolating, with a computer, the missing frequencies from the known frequencies by applying the filter; recomposing, with a computer, the known frequencies and the missing frequencies back into time and the one or more spatial dimensions; and prospecting for hydrocarbons with geophysical data that includes the missing frequencies.

12 Claims, 3 Drawing Sheets

(56) References Cited

U.S. PATENT DOCUMENTS

| | | | | |
|---|---|---|---|---|
| 2011/0103182 A1* | 5/2011 | Martin | ............... | G01V 1/3808 367/24 |
| 2013/0238249 A1* | 9/2013 | Xu | ............... | G01V 1/3808 702/18 |
| 2014/0278116 A1* | 9/2014 | Halliday | ............... | G01V 1/005 702/14 |

OTHER PUBLICATIONS

Li, Yunyue E. et al. (2015), "A short note on phase and amplitude tracking for seismic event separation," *SEG Technical Program Expanded Abstracts*, pp. 3825-3829.

Ma, Yong et al. (2013) "Wave-equation reflection traveltime inversion with dynamic warping and full-waveform inversion", *Geophysics*, v. 78(6), pp. R223-R233.

Oldenburg, D. W. et al. (1983) "Recovery of the acoustic impedance from reflection seismograms", *Geophysics*, 48(10), pp. 1318-1337.

Spitz, S. (1991), "Seismic trace interpolation in the F-X domain", *Geophysics*, 56(6), pp. 785-794.

Symes, W. W. et al. (1991) "Velocity inversion by differential semblance optimization," *Geophysics*, v. 56(5), Special Section On Magnetic Minerals, pp. 654-663.

Warner, M. et al. (2015) "Adaptive Waveform Inversion—FWI Without Cycle Skipping", *SEG Full waveform Inversion: Depth Model Building Workshop*, Beijing, China, Jun. 2015, pp. 11-14.

\* cited by examiner

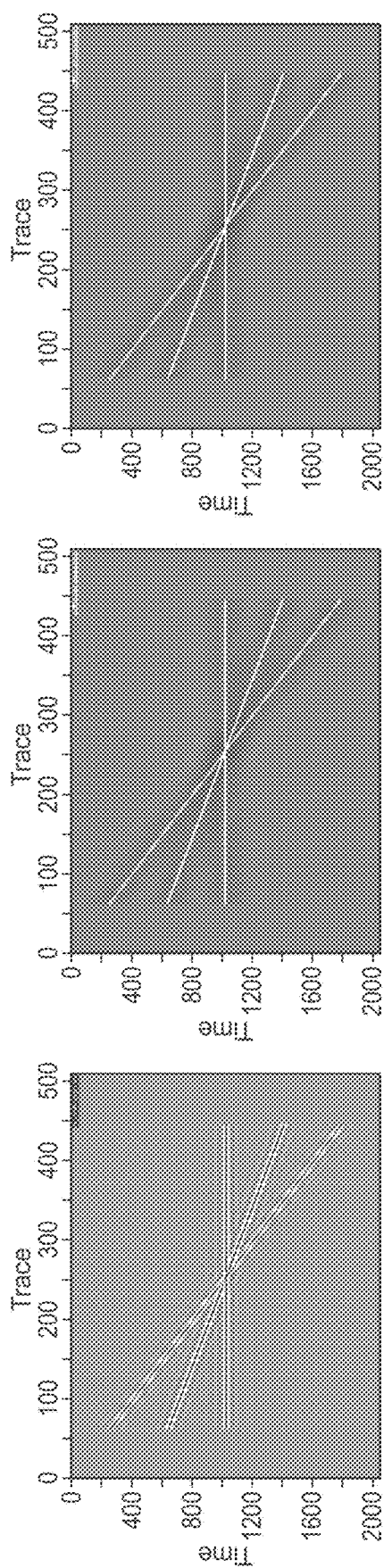
FIG. 2A
FIG. 2B
FIG. 2C
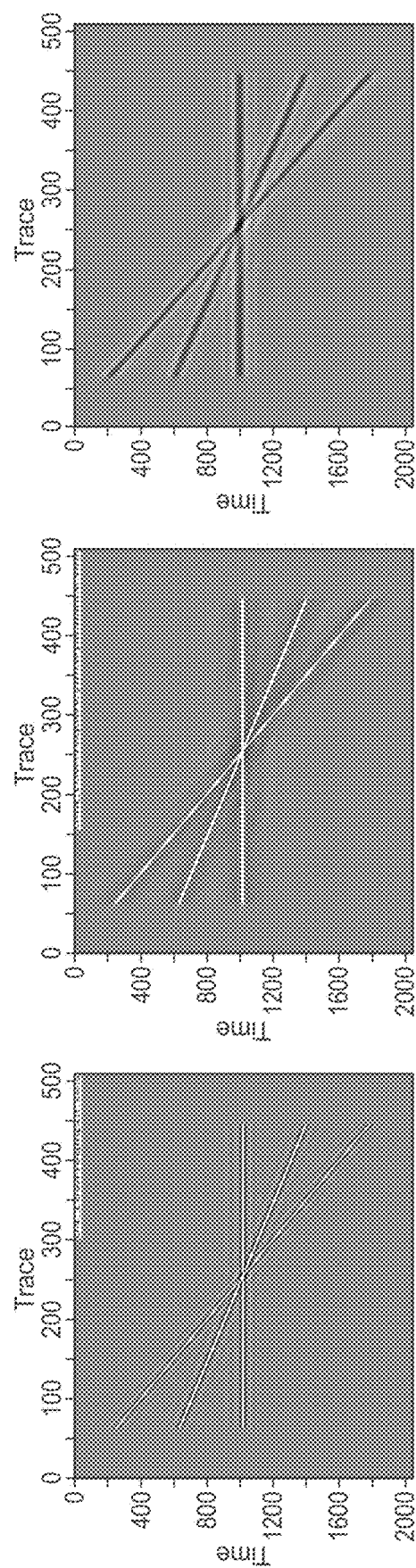
FIG. 3A
FIG. 3B
FIG. 3C

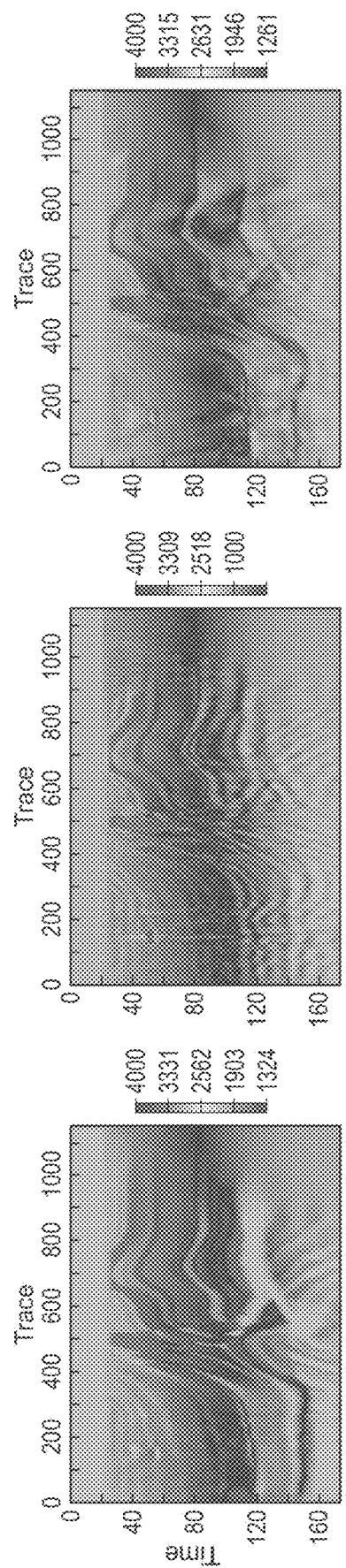

FABRICATION OF UNRECORDED DATA BY GAUSSIAN SLOWNESS PERIOD PACKET EXTRAPOLATION

CROSS-REFERENCE TO RELATED APPLICATION

This application claims the benefit of U.S. Provisional Patent Application 62/526,669 filed Jun. 29, 2017 entitled FABRICATION OF UNRECORDED DATA BY GAUSSIAN SLOWNESS PERIOD PACKET EXTRAPOLATION, the entirety of which is incorporated by reference herein.

TECHNOLOGICAL FIELD

This disclosure relates generally to the field of geophysical prospecting and, more particularly, to seismic data processing. Specifically, the disclosure relates to a method for inverting the full wavefield of seismic data to infer a physical properties model of the subsurface.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the geophones is processed in an effort to create an accurate mapping of the underground environment. The processed data is then examined with a goal of identifying geological formations that may contain hydrocarbons (e.g., oil and/or natural gas).

Full Wavefield Inversion (FWI) is a seismic method capable of utilizing the full seismic record, including the seismic events that are treated as "noise" by standard inversion algorithms. The goal of FWI is to build a realistic subsurface model by minimizing the misfit between the recorded seismic data and synthetic (or modeled) data obtained via numerical simulation.

FWI is a nonlinear problem which in practice is approximated as a series of linearized problems. This approximation generally works if the data generated from the starting model are within a half-cycle of the field data. This means that the data must contain frequencies low enough to bridge the gap between the starting model and the recorded data. If the field data do not contain low enough frequencies to match this, linearization fails and a cycle-skipped local solution is realized instead of the global solution. Put another way, missing low frequency data and accurately predicted low frequency data (with a zero residual) are treated identically in a simple FWI algorithm. When running FWI, the process converges and updating of the model stops when the residual is zero (or some other predetermined stopping criteria is met). A zero residual could be the result of the modeled data matching the recorded data, having no data to match, or some combination of the two. In an extreme case, if FWI is run with no data, the residual doesn't exist or is zero. Examining this frequency-by-frequency, if there are no low frequencies, there is an implicit assumption that the modeled data matches the recorded data at these frequencies, and that the starting model is correct. Cycle skipping refers to when a traveltime difference between events simulated numerically in a computer and those acquired in the field exceeds half the period corresponding to the dominant frequency of the data.

If an FWI model is cycle skipped, the inverted FWI result is an inaccurate representation of the actual subsurface. This inaccuracy can lead to incorrect hydrocarbon exploration and development decisions. As discussed below, the present technological advancement can help avoid this cycle skipping problem, allowing FWI to produce a more accurate representation of the subsurface, aiding the decision making process in hydrocarbon exploration and development.

Many approaches exist to address this cycle-skipping problem. Some expand the model space to incorporate additional constraints besides data fit, such as gather flatness in differential semblance optimization (Symes and Carazzone, 1991). Others change the objective function to include dynamic warping (Ma and Hale, 2013) or a shaping filter (Warner and Guasch, 2015) to match cycle-skipped modeled data to the field data. Yet others still generate low frequencies from the existing data which are then matched by the simulated data in the inversion. Two examples of this last approach are sparse spike deconvolution (Fei et al., 2012) and event-tracking methods (Li and Demanet, 2015).

SUMMARY

A computer-implemented method for generating missing frequencies within geophysical data, the method including: decomposing, with a computer, the geophysical data into frequencies and slowness or wavenumber along time and one or more spatial dimensions; estimating, with a computer, a filter across known frequencies within the geophysical data for each time, spatial dimension, and slowness or wavenumber sample; extrapolating or interpolating, with a computer, the missing frequencies from the known frequencies by applying the filter; recomposing, with a computer, the known frequencies and the missing frequencies back into time and the one or more spatial dimensions, which generates updated geophysical data that includes the missing frequencies; and prospecting for hydrocarbons with the updated geophysical data.

In the method, the decomposing can include applying a GaSP transform.

In the method, the decomposing can include applying a transform that decomposes the geophysical data into slowness or wavenumber and a linearly-spaced range of frequencies.

In the method, the filter can be a Wiener prediction filter.

In the method, the extrapolating or interpolating can include extrapolating or interpolating along frequency for each time, spatial, and slowness or wavenumber dimension.

In the method, a length of the Wiener prediction filter can be 1.

In the method, the estimating can include estimating the filter with autoregression across frequencies.

The method can further include executing a full wavefield inversion process with the updated geophysical data, which includes generating a physical property model, wherein the prospecting for hydrocarbons includes deriving a hydrocarbon location from the physical property model.

The method of can further include causing a well to be drilled at the hydrocarbon location.

The method can include generating a subsurface image that depicts representations of subsurface reflectors at the hydrocarbon location.

In the method, the missing frequencies can be from a hole in a spectrum of the geophysical data caused by a ghost notch.

In the method, the geophysical data can be seismic data.

In the method, the filter can be a prediction filter.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 2A illustrates a low cut of exemplary original data.

FIG. 2B illustrates a full band of the exemplary original data.

FIG. 2C illustrates a difference between FIGS. 2A and 2B.

FIG. 3A illustrates a low cut of exemplary original data.

FIG. 3B illustrates the data shown in FIG. 3A after application of an embodiment of the present technological advancement.

FIG. 3C illustrates a difference between FIGS. 3A and 3B.

FIG. 4A illustrates an output of an FWI algorithm using full-band data.

FIG. 4B illustrates an output of an FWI algorithm using low-cut data.

FIG. 4C illustrates an output of an FWI algorithm using data processed according to an embodiment of the present technological advancement.

DETAILED DESCRIPTION OF EXAMPLE EMBODIMENTS

Figure 1:
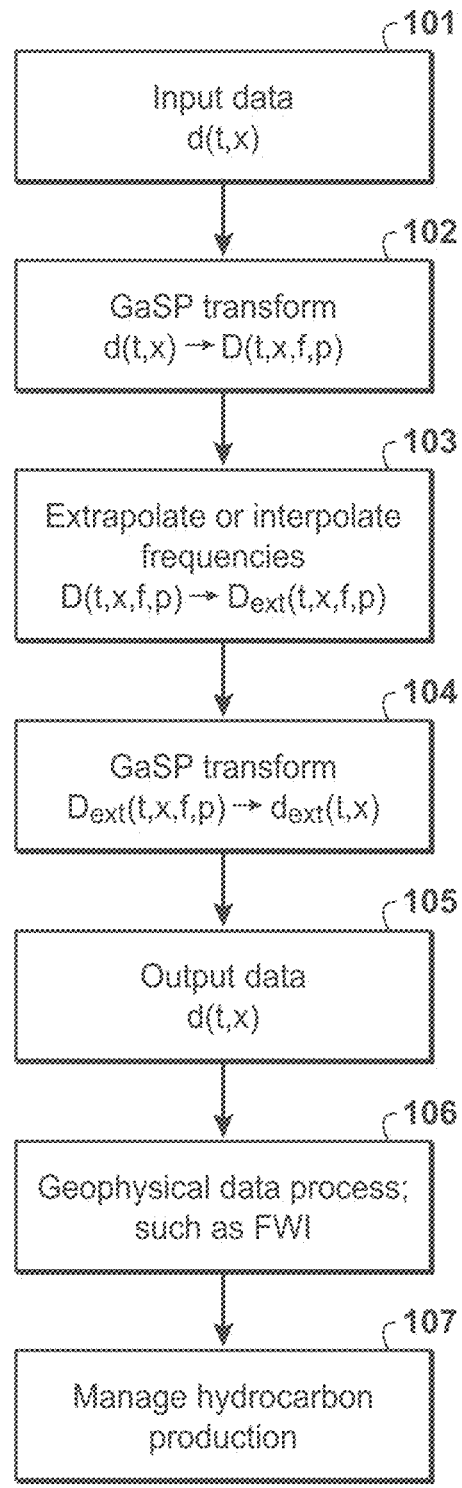
FIG. 1 illustrates a method embodying the present technological advancement.

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

An exemplary embodiment of the present technological is a method to generate missing low frequencies, which is designed to be robust and easy to parameterize. While examples discussed herein pertain to missing low frequencies (or unrecorded frequencies), the present technological advancement is applicable to generating missing high frequencies or other frequencies that can be extrapolated from the recorded data. The present technological advancement can provide a processing workaround to the difficult technological problem of recording low frequency seismic data. Such limitations in the recording to low frequency seismic data arise because of the recording hardware, source generation, and proximity to the sea surface, which introduces a ghost reflection that attenuates low frequencies. With respect to the state-of-the-art, low frequencies may vary from 3-10 Hz, depending on the situation.

The present technological advancement can utilize what is known as autoregression across frequencies, where a Wiener-type prediction filter (or more generally a prediction filter as a Wiener filter is not the only useable prediction filter) is estimated across known frequencies and is used to extrapolate missing low frequencies. This has been done for impedance inversion (Oldenburg et al., 1983) and for spatial prediction filters used for missing trace interpolation (Spitz, 1991). This approach has an underlying assumption that the data are comprised of a series of complex sinusoids across the frequency axis, which means that if the amplitude spectrum is flat the data are a series of spikes. One question that arises with this approach is what the length of the prediction filter should be. This length will vary as a function of time and trace number. One other issue with this approach is that since it is a trace-by-trace operation it would be susceptible to noise.

The present technological advancement can combine autoregression with a nonstationary frequency-slowness decomposition; the Gaussian Slowness Period Packets ("GaSPs"), for example. This transform decomposes data in time (t) and space (x) into t, x, frequency (f), and apparent slowness (p) using a series of separable filters: Gaussians modulated by complex exponentials. Once the data have been decomposed, one can extrapolate along frequency for each t, x, and p point, followed by an inverse GaSP transform. Using this approach has several benefits over a trace-by-trace spiking deconvolution or autoregression. GaSPs are described in U.S. Pat. No. 9,091,789, the entirety of which is hereby incorporated by reference. GaSPs are one example of a suitable transform, but are not be required by the present technological advancement. Any transform that decomposes data into apparent slowness (or wavenumber) and into a linearly-spaced range of frequencies could also be used. The GaSP transform may be best suited for this, but Curvelets and wave atoms would work well too, but they are not linearly spaced in frequency so a prediction filter would less accurately predict a local plane wave. The present technological advancement may not work as well when the transform is unable to separate multiple co-located events with a similar arrival time and a similar apparent slowness. In addition to decomposing the data into apparent slowness, the data could be decomposed into wavenumber k. A complication with this is that when estimating and using the prediction filter, which needs to be done over slowness, there would be interpolation back and forth to wavenumber from slowness, which is possible. The issue here is that when you change frequency, the wavenumber range will change, but the slowness value will not. An embodiment of the present technological advancement could estimate a filter across frequencies at constant slowness, time, and space. If wavenumber were used, the wavenumber will not be constant across frequencies.

The first benefit of the present technological advancement is that by decomposing the data into slowness and estimating a filter for each time, space, and slowness, we know the filter length should be 1 (i.e., the prediction filter can be a single complex number; wherein length, number of terms, and number of coefficients are all equivalent), as simultaneous events are separated by slowness, arrival time, and spatial position such that we should only have one complex exponential per (t, x, p) point. In a more traditional window or trace-by-trace approach this parameter would be much more difficult to estimate and would vary with space and time. Another benefit of the present technological advancement is that by decomposing into local plane waves, incoherent noise is attenuated before estimating a filter, which provides a result that is more robust to incoherent noise.

This present technological advancement may have limitations inherent to the locally-planar assumption and the resolution of the transform. Results generated from present technological advancement on dispersive events may be lower in quality.

While this prediction filter will predict a phase of a local plane wave at an unrecorded frequency, it will not give a reliable amplitude estimate. The present technological advancement needs an externally-provided target amplitude spectrum that can be matched to the relative amplitude of the frequencies at each point in time, space, and slowness. A target wavelet with the desired amplitude spectrum will suffice. The process is effectively shaping data and creating phase information where the input data may not be accurate.

FIG. 1 illustrates a method embodying the present technological advancement. In step 101, input data d(t, x) is obtained. The data can be seismic data, and any other types of data that look planar in some domain, including other types of geophysical data (e.g., ground penetrating radar). Moreover, the present technological advancement can scale up to x, y, z and can also scale up to a multidimensional GaSP transform, so the process could loop over t, x, y, z, px, py, pz as well.

In step 102, a GaSP transform (or other suitable transform as discussed above) is applied to transform d(t, x) to D (t, x, f, p). This step can also include establishing desired input parameters, including desired frequency range ($f_{max}$ and $f_{min}$), slowness ($p_{min}$ and $p_{max}$), half widths at half maxima $h_t$ and $h_x$ for time and space, respectfully, and target wavelet with the desired amplitude spectrum. While slowness is discussed in this example, wavenumber (k) could be used, wherein slowness p is related to the wavenumber k by $k=f_p$.

Step 103 includes extrapolating frequencies. This can be accomplished according to the following algorithm.
I. Loop over each input panel (cable from a marine shot gather):
  a. Loop over range of slownesses in GaSP transform ($p_0$):
    i. GaSP transform data fixing slowness g(t, x, $p_0$, f)=GaSP (d(t, x)) [from step 102]
    ii. Loop over spatial samples $x_i$:
      1. Loop over time samples $t_j$:
        a. Estimate 1-term prediction filter (e.g., a complex number; the current input is multiplied by the complex number to get a prediction of the next sample; here is provides a measure of how much the phase changes at each frequency, and the multiplication adds that phase) above low-cut frequency across (the filter is calculated using the zeroth and first lag of the autocorrelation of the input signal; that input signal being a series of frequencies that are within the signal range (>f min), at constant time, space, and slowness) |f|>|f min|.
        b. Use filter to predict phase of output at missing low frequencies |f|<|f min| (a prediction filter predicts something based on a previous recording; here it would take the last known frequency (i), multiply it by the one-term filter, and that would give the first unknown frequency (i+1); it can then be multiplied by the filter and this will give an estimate of the next frequency (i+2); and this process can be repeated until one is out of frequencies to predict).
        c. Scale new frequencies to GaSPed amplitude spectrum from target wavelet.

The present technological advancement can also include interpolating. Since there could be negative frequencies, the process could actually interpolate both the low negative and positive frequencies. This could also be used for holes in the data spectrum, for example from a ghost notch.

In step 104, an inverse GaSP transform is applied. In step 105, data is accumulated or recomposed into output(t, x)+=invGaSP(d(t, x, $p_0$, f)), wherein += is a shorthand for accumulating–output(t, x)=output(t, x)+invGaSP(d(t, x, $p_0$, f).

In step 105, the output data can then be input into geophysical data processes (step 106), such as FWI. Geophysical data processing can include generating an image of the earth's subsurface from a subsurface physical property model that identifies where subsurface structures or reflectors are located. The inclusion of such low frequency data into geophysical data processing, such as FWI, can prevent the process from converging at an incorrect cycle-skipped local minima, instead converging at a more accurate non-cycle skipped solution.

Step 107 can include managing hydrocarbons. In step 107, a final subsurface physical property model generated from FWI or another geophysical data process can be used to prospect for hydrocarbons or otherwise be used in hydrocarbon management. As used herein, hydrocarbon management includes hydrocarbon extraction, hydrocarbon production, hydrocarbon exploration, hydrocarbon prospecting, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from the subsurface image.

FIGS. 2A-2C illustrate a reference case, where broadband seismic data has been low-cut filtered from a low of 2 Hz to a new low of 15 Hz. FIG. 2A illustrates a low cut of exemplary original data. FIG. 2B illustrates a full band of the exemplary original data. FIG. 2C illustrates a difference between FIGS. 2A and 2B.

FIGS. 3A-3C illustrate an application of the present technological advancement. FIG. 3A illustrates a low cut of exemplary original data. FIG. 3B illustrates the data show in FIG. 3A after application of an embodiment of the present technological advancement. FIG. 3C illustrates a difference between FIGS. 3A and 3B. The results achieved by the present technological advancement in FIG. 3B (e.g., recreating the low frequencies that were removed by the low-cut filter) are not identical to the original broadband data in FIG. 2B, but they are very close (i.e., FIG. 2C is very similar to that of FIG. 3C).

FIGS. 4A-4C provide an example of using the present technological advancement with FWI. FWI is a computer-implemented geophysical method that is used to invert for subsurface properties, such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated within step 103 until the objective function is satisfactorily minimized and the final subsurface model is generated. A global or local optimization method is used to minimize the objective function and to update the subsurface model.

FIGS. 4A-C illustrate application of the present technological advancement as applied to synthetic data generated from the Marmousi model. FIG. 4A illustrates an output of an FWI algorithm using full-band data with frequencies down to 3 Hz. FIG. 4A is close to the true model, which is not shown. FIG. 4B illustrates an output of an FWI algorithm using low-cut data. The result shown in FIG. 4B is in a local minimum, and is far from the reference solution in FIG. 4A. FIG. 4C illustrate an output of an FWI algorithm using data processed according to an embodiment of the present technological advancement; wherein the method of FIG. 1 is used to supply the missing low frequency data to the low-cut data used in FIG. 4B. The result in FIG. 4C is not identical to the reference result of FIG. 4A, but is significantly closer to it than the data missing low frequencies (FIG. 4B).

In all practical applications, the present technological advancement must be used in conjunction with a computer, programmed in accordance with the disclosures herein. Preferably, in order to efficiently perform FWI, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

The following references are incorporated by reference in their entirety:

W. W. Symes and J. J. Carazzone (1991) "Velocity inversion by differential semblance optimization," *Geophysics*, v. 56(5), Special Section On Magnetic Minerals, pp. 654-663;

Yong Ma and Dave Hale (2013) "Wave-equation reflection traveltime inversion with dynamic warping and full-waveform inversion", *Geophysics*, v. 78(6), pp. R223-R233;

M. Warner, L. Guasch and G. Yao (2015) "Adaptive Waveform Inversion—FWI Without Cycle Skipping", *SEG Full waveform Inversion: Depth Model Building Workshop*, Beijing, China, June 2015, pp. 11-14;

Tong W. Fei, Yi Luo, Fuhao Qin, and Panos G. Kelamis (2012) "Full waveform inversion without low frequencies: A synthetic study," *SEG Technical Program Expanded Abstracts*, pp. 1-5, Yunyue Elita Li and Laurent Demanet, (2015), "A short note on phase and amplitude tracking for seismic event separation," *SEG Technical Program Expanded Abstracts*, pp. 3825-3829;

D. W. Oldenburg, T. Scheuer, and S. Levy (1983) "Recovery of the acoustic impedance from reflection seismograms", *Geophysics*, 48(10), pp. 1318-1337;

S. Spitz (1991), "Seismic trace interpolation in the F-X domain", *Geophysics*, 56(6), pp. 785-794; and U.S. Pat. No. 9,091,789 to Curry (2015).

What is claimed is:

1. A computer-implemented method for generating missing frequencies within geophysical data, said method comprising:

decomposing, with a computer, the geophysical data into frequencies and slowness or wavenumber along time and one or more spatial dimensions, wherein the decomposing includes applying a GaSP transform;

estimating, with a computer, a filter across known frequencies within the geophysical data for each time, spatial dimension, and slowness or wavenumber sample;

extrapolating or interpolating, with a computer, the missing frequencies from the known frequencies by applying the filter;

recomposing, with a computer, the known frequencies and the missing frequencies back into time and the one or more spatial dimensions, which generates updated geophysical data that includes the missing frequencies; and prospecting for hydrocarbons with the updated geophysical data.

2. The method of claim 1, wherein the decomposing includes applying a transform that decomposes the geophysical data into slowness or wavenumber and a linearly-spaced range of frequencies.

3. The method of claim 1, wherein the filter is a Wiener prediction filter.

4. The method of claim 3, wherein the extrapolating or interpolating includes extrapolating or interpolating along frequency for each time, spatial, and slowness or wavenumber dimension.

5. The method of claim 3, wherein a length of the Wiener prediction filter is 1.

6. The method of claim 1, wherein estimating includes estimating the filter with autoregression across frequencies.

7. The method of claim 1, further comprising executing a full wavefield inversion process with the updated geophysical data, which includes generating a physical property model, wherein the prospecting for hydrocarbons includes deriving a hydrocarbon location from the physical property model.

8. The method of claim 7, further comprising causing a well to be drilled at the hydrocarbon location.

9. The method of claim 7, further comprising generating a subsurface image that depicts representations of subsurface reflectors at the hydrocarbon location.

10. The method of claim 1, wherein the missing frequencies are from a hole in a spectrum of the geophysical data caused by a ghost notch.

11. The method of claim 1, wherein the geophysical data is seismic data.

12. The method of claim 1, wherein the filter is a prediction filter.

* * * * *